(12) United States Patent
Richards

(10) Patent No.: US 6,449,315 B2
(45) Date of Patent: Sep. 10, 2002

(54) SERIAL LINE SYNCHRONIZATION METHOD AND APPARATUS

(75) Inventor: Glenn L. Richards, Orlando, FL (US)

(73) Assignee: Siemens Information and Communication Networks, Inc., Boca Raton, FL (US)

(*) Notice: Subject to any disclaimer, the term of this patent is extended or adjusted under 35 U.S.C. 154(b) by 0 days.

(21) Appl. No.: 09/847,846

(22) Filed: May 1, 2001

Related U.S. Application Data (63) Continuation of application No. 08/820,919, filed on Mar. 19, 1997, now Pat. No. 6,269,127, and a continuation of application No. 08/670,032, filed on Jun. 25, 1996, now abandoned, and a continuation of application No. 07/950,857, filed on Sep. 24, 1992, now abandoned.

(51) Int. Cl.[7] .............................. H04L 27/18; H04L 7/00
(52) U.S. Cl. ........................ 375/282; 375/333; 375/361
(58) Field of Search ................................. 375/219, 257, 375/282, 293, 333, 337, 360, 361, 362, 368; 341/70, 71, 72

(56) References Cited

U.S. PATENT DOCUMENTS

| | | | | |
|---|---|---|---|---|
| 3,967,061 A | * | 6/1976 | Dobias ........................ 341/71 |
| 3,967,062 A | * | 6/1976 | Dobias ........................ 341/71 |
| 4,071,692 A | * | 1/1978 | Weir et al. ..................... 375/17 |
| 4,215,245 A | * | 7/1980 | Bellisio ....................... 370/545 |
| 4,402,084 A | * | 8/1983 | Jungmeister ................. 375/360 |
| 4,442,528 A | * | 4/1984 | Fukuda ......................... 341/73 |
| 4,542,420 A | * | 9/1985 | Kozlik et al. ................ 375/361 |
| 4,562,422 A | * | 12/1985 | Pospischil ..................... 341/73 |
| 4,884,074 A | | 11/1989 | Nourry et al. ................. 341/70 |
| 4,897,854 A | * | 1/1990 | Harris et al. ................. 375/286 |
| 5,040,193 A | * | 8/1991 | Leonowich et al. ........ 375/333 |
| 5,050,194 A | * | 9/1991 | Pickering et al. ........... 375/360 |
| 5,107,490 A | * | 4/1992 | Wilson et al. ............... 370/404 |
| 5,113,186 A | * | 5/1992 | Remson ........................ 341/68 |
| 5,200,980 A | * | 4/1993 | Briddell ...................... 375/333 |
| 5,245,635 A | * | 9/1993 | Martinez et al. ............ 375/361 |
| 5,249,186 A | * | 9/1993 | Remson ........................ 371/55 |
| 6,198,413 B1 | * | 3/2001 | Widmer ....................... 341/59 |

FOREIGN PATENT DOCUMENTS

EP 0 266 285 A1 * 5/1988
EP 0 392 653 A2 * 10/1990

* cited by examiner

Primary Examiner—Young T. Tse (57) ABSTRACT

Apparatus, and an accompanying method, for transmitting a frame synchronization signal and a data signal simultaneously through a serial transmission medium (170). Specifically within a data transmitter (105), a frame synchronization signal, a clock signal and a data signal, are encoded to form a single bi-phase mark signal having the frame synchronization signal incorporated into the bi-phase mark signal as a phase-shift. The bi-phase mark signal is then transmitted through a suitable serial transmission medium. A receiver (175), connected to the transmission medium, receives and amplifies an incoming bi-phase mark signal appearing on the medium, and, in turn, synthesizes the clock, frame synchronization, and data signals from this bi-phase mark signal.

28 Claims, 5 Drawing Sheets

SERIAL LINE SYNCHRONIZATION METHOD AND APPARATUS

CROSS-REFERENCE TO RELATED APPLICATIONS

This application is a continuation of U.S. application Ser. No. 08/820,919, filed Mar. 19, 1997, now U.S. Pat. No. 6,269,127, a continuation of U.S. application Ser. No. 08/670,032, filed Jun. 25, 1996, now abandoned, a continuation of U.S. application Ser. No. 07/950,857, filed Sep. 24, 1992, now abandoned.

BACKGROUND OF THE INVENTION

1. Field of the Invention

The invention relates generally to data communication systems, and, more particularly, to methods and apparatus for synchronizing transmissions of serial data signals transmitted via such systems.

2. Description of the Existing Art

Currently, high speed serial line communications is experiencing increasing use across many application areas, not the least of which being telecommunications. Generally, serial line communication systems transmit digital data, whether digitized voice in a telephone system or data from a computer, as a serial bit stream over various transmission media, such as wire cables, radio waves, fiber optic cables and the like. Typically, to efficiently transfer large quantities of data, individual bit streams from multiple data sources are multiplexed to form a single, serial bit stream. After transmission along a single transmission medium, the multiplexed bit stream is demultiplexed to reproduce the individual bit streams.

To facilitate proper routing of the individual bit streams to their respective destinations, the multiplexed serial bit stream must be organized so that a demultiplexer can identify and separate the bits, within the multiplexed bit stream, that are associated with each individual bit stream. Proper routing is accomplished by organizing the multiplexed bit stream into sequential frames each containing a sequence of time-slots. In practice, at a transmitter end of a serial line communication system, a multiplexer inserts bits from each individual bit stream into a corresponding time-slot within each frame. The locations of the bits within a frame comprising any one individual bit stream are known by counting bit positions, or time-slots, relative to the beginning, or end, of each frame. For example, in a 30 time-slot frame carrying bits from three data sources, bits from the first, second and third sources may be separately carried in the first, second and third successive ten time-slots relative to the beginning of the frame. Thus, specific time-slots, illustratively ten such slots, in each frame correspond to each data source. In this manner, each individual bit stream can be extracted from the frames and reassembled into individual bit streams associated with each particular data source.

Consequently, through proliferation of such serial line communications systems utilizing frame formatted data, a need has existed in the art to accurately determine a beginning, or an end, of each frame. Typically, a specific sequence of bits known as a "framing sequence" marks the beginning (or end) of each frame. To maintain frame synchronization, a data receiver, which may be a component of a demultiplexer, monitors a received bit stream for the framing sequence. Subsequently, the data receiver produces a frame synchronization signal upon each occurrence of the framing sequence. For example, in a 30-channel pulse code modulation (PCM) system commonly used for telephone transmissions in Europe and Asia, a frame comprises 32 time-slots with each slot containing 8 bits of data. of these, 31 time-slots contain information bits from individual bit streams with the remaining time-slot, specifically the first in the frame, containing an 8-bit framing sequence. The eight bits in the framing sequence are typically:

X0011011, for even frames, and

X1AYYYYY, for odd frames, where the bits labeled X and Y are usually set to 1. The bit labeled A can be used as an alarm bit that is set to 1 whenever frame synchronization is lost.

Detrimentally, due to errors which typically arise from noise in the transmission medium, the information bits within a frame can be corrupted such that these bits identically resemble the framing is sequence. In this instance, the data receiver would erroneously synchronize to the information bits rather than the framing sequence thereby causing a frame synchronization error and a resulting loss of data. To avoid such errors, oftentimes a second signal, a frame synchronization signal, is transmitted via a separate and independent transmission medium to the data receiver. The frame synchronization signal, in combination with the framing sequence, indicates the beginning (or end) of the frame. This arrangement avoids any ambiguities that may arise between information bits and the framing sequence. However, due to the additional transmission medium and associated receiver circuitry, such a dual transmission arrangement is costly and complex.

Thus, a need currently exists in the art for a technique, specifically apparatus and an accompanying method, for providing accurate frame synchronization in a serial line communication system. Advantageously, this technique should be immune to frame synchronization errors caused by certain data sequences in a transmitted frame. Furthermore, this technique should carry both a frame synchronization signal and a data bit stream, i.e., the information and framing sequence bits over a single serial transmission medium.

SUMMARY OF THE INVENTION

Accordingly, an object of the present invention is to provide a technique that can receive frame synchronization signals and data over a single serial transmission medium.

A specific object is to provide such a technique that is substantially immune to frame synchronization errors caused by information bit sequences which are identical to the framing sequences.

These and other objects are advantageously achieved through an inventive serial line synchronization technique. Specifically, in accordance with the inventive teachings, a frame synchronization signal, a clock signal and a data signal are encoded to form a single bi-phase mark signal wherein the frame synchronization signal is incorporated into the bi-phase mark signal as a protocol violation in a modulation protocol defining the bi-phase mark signal. The bi-phase mark signal is then transmitted through a transmission medium. A receiver, connected to the transmission medium, receives and amplifies the bi-phase mark signal. Subsequently, the receiver decodes the amplified bi-phase mark signal and reproduces the clock, frame synchronization and data signals.

By advantageously incorporating a frame synchronization signal into the bi-phase mark signal, the inventive serial line synchronization technique does not require a second transmission medium and associated receiver circuitry to transmit a frame synchronization signal separate from the data signal.

BRIEF DESCRIPTION OF THE DRAWINGS

The teachings of the present invention can be readily understood in conjunction with the accompanying drawings, in which.

To facilitate understanding, identical reference numerals have been used, where possible, to designate elements that are common to the figures.

DETAILED DESCRIPTION

Though the ensuing disclosure of the inventive technique illustratively discusses the invention in the context of a telecommunications system, those skilled in the art will recognize that the invention is useful in any serial line communication system that uses frame formatted data. Such systems include integrated services digital networks (ISDN), local area networks (LAN), packet radio systems and the like.

Figure 1:
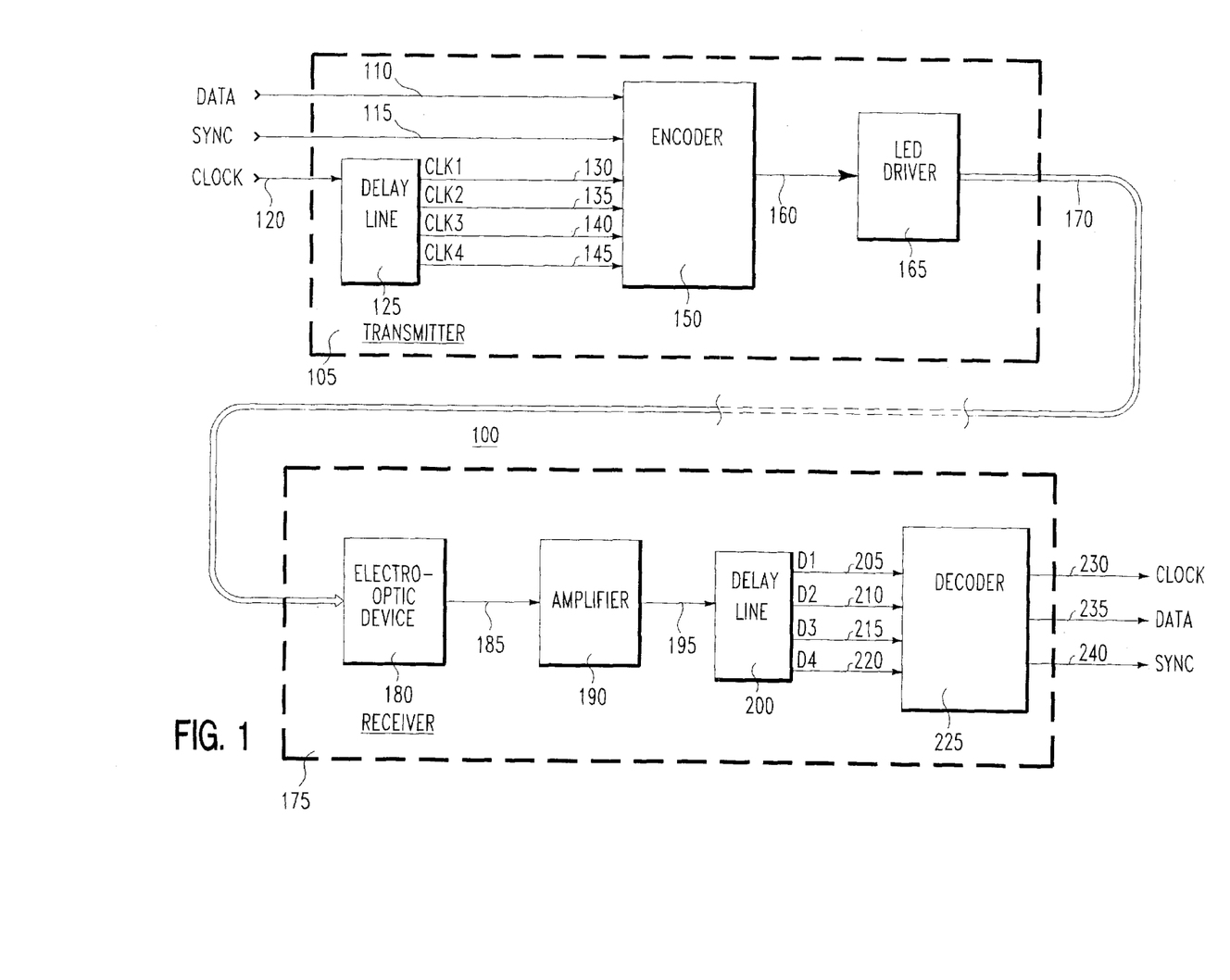
FIG. 1 is an amplified high level block diagram of data transmission system 100 which incorporates the inventive serial line synchronization technique.

FIG. 1 depicts a simplified, high level block diagram of data transmission system 100 incorporating the inventive serial line synchronization technique. System 100 comprises serial line transmitter 105 connected, via optical fiber 170, to serial line receiver 175. Line 110 carries previously multiplexed and framed data (DATA) to an input of transmitter 105. Additionally, line 115 carries a frame synchronization signal (SYNC) and line 120 carries a clock signal (CLOCK), both to respective inputs of transmitter 105. Transmitter 105 merges the DATA, SYNC, and CLOCK signals into a single serial bit stream using an inventive bi-phase mark modulation protocol. Subsequently, the serial bit stream is transmitted, via optical fiber 170, to receiver 175. A fiber optic transmission medium is, of course, illustrative. in practice, the transmission medium can also be, e.g., a twisted wire pair, a coaxial cable, a microwave transmission channel and the like. Upon reception of the signal propagating on the transmission medium, receiver 175 separates the CLOCK, SYNC and DATA signals and produces each of these signals on lines 230, 235 and 240, respectively. Ultimately, a demultiplexer (not shown) utilizes the individual signals to demultiplex the various individual bit streams contained in the DATA signal appearing on lead 235.

Generally speaking, the CLOCK, SYNC and DATA signals are related to one another. In this regard, the CLOCK signal is phase synchronous with bits comprising the DATA signal; the SYNC signal indicates a reference point within a frame of data bits. Illustratively, the reference point is an end of a last time-slot in the frame. The invention uses a modulation technique known as a bi-phase mark protocol to combine the CLOCK and DATA signals into a serial bit stream. Simultaneously, the invention encodes the SYNC signal into this serial bit stream as a violation of the bi-phase mark protocol.

More specifically, transmitter 105 comprises delay line 125, encoder 150 and light emitting diode (LED) driver 165. Delay line 125 receives, on line 120, the CLOCK signal and produces four delayed clock signals (CLK1, CLK2, CLK3, and CLK4) each having a different delay relative to the CLOCK signal. For instance, the delayed clock signal on line 130 is delayed by approximately ¼ of a data bit relative to the input CLOCK signal. Similarly, the delayed clock signals on lines 135, 140 and 145 are delayed ½ bit, ¾ bit and 1 bit, respectively. Typically, a data bit has a duration (or interval) equivalent to one clock cycle. For example, in a system having a bit duration of approximately 40 nS, i.e., a bit rate of 24.576 Mb/s, the delay line provides delays in 10 nS increments.

Encoder 150 has DATA, SYNC and the tour delayed clock signals appearing on lines 130, 135, 140, and 145 as inputs. Generally, the encoder merges the CLOCK, DATA and SYNC signals into a single serial bit stream. This is accomplished by phase synchronizing the CLOCK and DATA signals and then merging these two signals into a bit stream using a bi-phase mark protocol (as described in detail below). Suffice it to say, the bi-phase mark protocol permits the frame synchronization signal to be inserted into the bit stream as a protocol violation.

Encoder 150 produces, on line 160, a bi-phase mark signal which serves as an input to LED driver 165. The LED driver converts an electrical signal representing the bi-phase mark signal into an optical signal. LED drivers are well-known in the art, and therefore, a detailed description of such a driver is unnecessary to understand the invention. The optical signal produced by LED driver 165 is then propagated over optical fiber 170 to receiver 175.

Receiver 175, in general, reverses the encoding process of the transmitter and produces, on lines 230, 235, and 240, the CLOCK, DATA, and SYNC signals, respectively. Specifically, receiver 175 comprises electro-optic (E-O) device 180, amplifier 190, delay line 200 and decoder 225. E-O devices are well-known in the art, and therefore, a detailed description of such a device is also unnecessary to understand the invention. E-O device 180 accepts, as an input, the optical signal emanating from optical fiber 170. As is well-known in the art, an E-O device converts the optical signal into a representative electrical signal. Typically, the representative electrical signal, on line 185, has relatively low signal strength and thus must be amplified. Amplifier 190 amplifies and "squares up" the electrical signal and produces a bi-phase mark signal that is substantially identical to the bi-phase mark signal that was produced, on line 160, by encoder 150. Circuitry for accomplishing the amplification and squaring functions is well-known in the art and thus need not be described in any further detail.

Delay line 200 receives the bi-phase mark signal, appearing on line 195, as an input and, as with the CLOCK signal above, generates four delayed output signals (D1, D2, D3, and D4). Each delayed signal on lines 205, 210, 215, and 220 is respectively delayed by a ¼, ½, ¾, and 1 bit interval, with respect to the bi-phase mark signal on line 195. Using the four delayed bi-phase mark signals, decoder 225 separates the CLOCK, SYNC and DATA signals and produces each signal on lines 230, 235 and 240, respectively.

Next, a detailed discussion of the bi-phase mark protocol is presented. This discussion is followed by a detailed description of encoder 150 and decoder 175 that are used to implement the inventive synchronization technique.

Generally, encoder 150 combines the DATA, SYNC and CLOCK signals into a serial bit stream. The inventive technique merges the data and clock signals into a serial bit stream using a bi-phase mark protocol. The frame synchronization signal is introduced into the bit stream as a violation of that protocol. Generally, the bi-phase mark protocol encodes a digital stream of ones and zeros as a series of transitions during each bit interval, i.e., a clock cycle. Specifically, each zero is encoded as a transition at the beginning of a bit interval and each one is encoded as a transition at the beginning and at the middle of each bit interval. In this manner, the clock signal is inherently encoded into the bi-phase mark bit stream, i.e., as a transition at the beginning of each bit interval.

The frame synchronization signal is inserted by violating the requirement for a transition at the beginning of each bit interval. As discussed above, the data signal, after being formatted into frames, arrives at the transmitter. Thus, the framing sequence is already present in a time-slot within each frame when the frame arrives at the transmitter. The frame synchronization signal occurs, i.e., is high, during the occurrence of the framing bits in the data stream. For example, an individual frame may contain 32 time-slots each containing 8 bits of data. Illustratively, time-slots 0 through 30 carry information bits from a number of individual data sources and time-slot 31 carries the framing sequence to indicate the end of a frame. Hence, during all or a portion of time-slot 31, the SYNC signal is high. Specifically, the frame synchronization signal should be high for at least one clock cycle in a bit position just prior to the position in the framing sequence where the protocol violation is to be inserted. Thus, continuing with the example, if the framing sequence in time-slot 31 is "00001011" and the protocol violation is to be positioned between the two consecutive ones, the frame synchronization signal should occur simultaneous with the second one, i.e., the second least significant bit. Accordingly, encoder 150 inserts a protocol violation between the last two bits, i.e., the framing sequence becomes "0000101v1", wherein the violation (v) removes a transition from the beginning of the last bit interval in time-slot 31.

Figure 2:
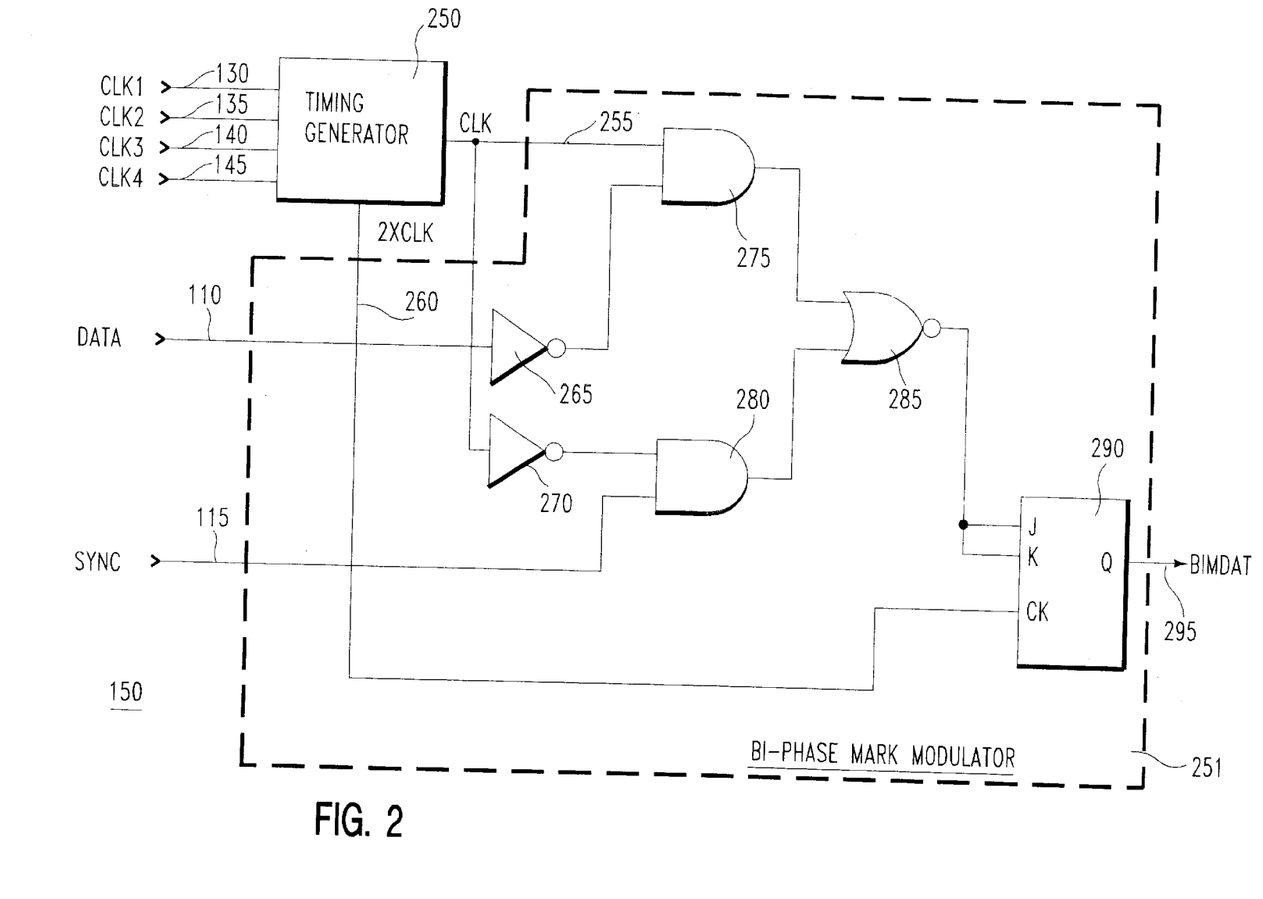
FIG. 2 is a schematic diagram of an inventive encoder 150.

Encoder 150 will now be discussed with simultaneous reference to FIGS. 2 and 3. Therefore, the reader should refer to both of these figures throughout the ensuing discussion. FIG. 2 depicts the circuit details of encoder 150, while FIG. 3 depicts a timing diagram showing the interrelation of important signals used and produced by encoder 150.

As shown in FIG. 2, encoder 150 comprises timing generator 250 and bi-phase mark modulator 251. Using the four delayed clock signals (CLK1, CLK2, CLK3, and CLK4) on lines 130, 135, 140 and 145, respectively, encoder 150 combines the CLOCK, DATA and SYNC signals and produces, on line 295, a bi-phase mark signal (BIMDAT). Specifically, timing generator 250 processes the four delayed clock signals to generate a clock signal (CLK) on line 255 and a signal (2XCLK), on line 260, the latter signal having double the frequency of the CLK signal and delayed by ⅛ of a bit interval relative to the CLK signal. The DATA signal, on line 110, and the SYNC signal, on line 115, in addition to the CLK and 2XCLK signals, form input signals to bi-phase mark modulator 251.

Figure 3:
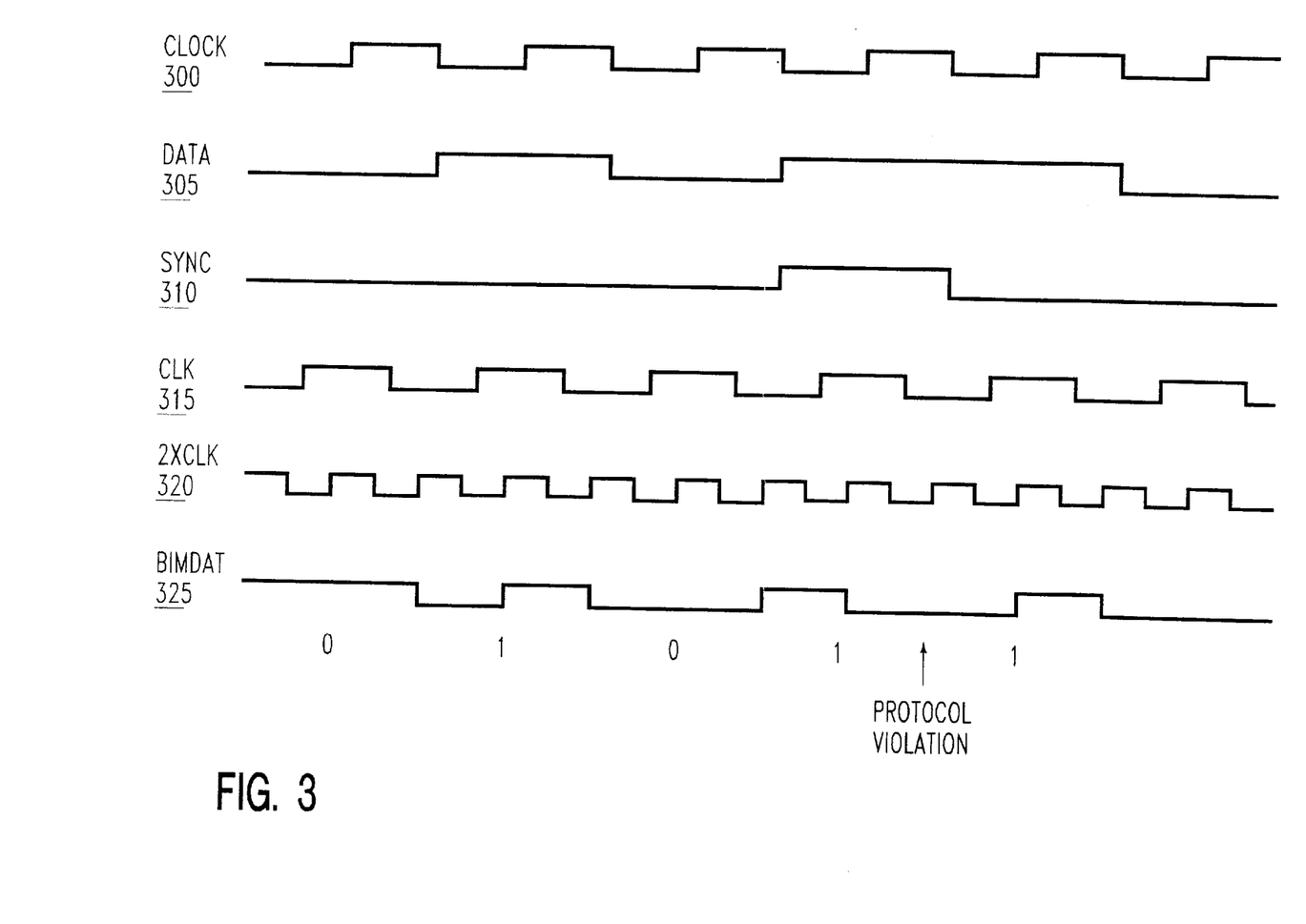
FIG. 3 is a timing diagram for the encoder depicted in FIG. 2.

FIG. 3 shows a timing diagram indicating the relative temporal positions of DATA 305, SYNC 310, CLK 315, 2XCLK 320, and BIMDAT 325 signals that form the input and output signals of the bi-phase mark modulator. CLOCK signal 300 is shown for reference purposes. CLOCK signal 300, DATA signal 305 and SYNC signal 310 are phase coherent, while CLK signal 315 is delayed by ¾ of a bit interval with respect to CLOCK signal 300. The signals shown correspond to the illustrative example, wherein time-slot 31 contains the framing sequence "00001011". For the sake of simplification, the timing diagram depicts only a portion of the framing sequence near where the protocol violation is inserted. Specifically, the sequence "01011" is shown.

Bi-phase mark modulator 251, shown in FIG. 2, contains logical AND gates 275 and 280, NOR gate 285, inverters 265 and 270, and J-K flip-flop 290. In effect, the modulator enables the CLK and inverted CLK signals to sample, through AND gates 275 and 280, both an inverted DATA signal and the SYNC signal. To facilitate this sampling, inverters 265 and 270 invert DATA and CLK signals 305 and 315, respectively. Subsequently, the resulting inverted signals are applied to one input of each AND gate 275 and 280. Line 255 which carries CLK signal 315 connects to the second input of AND gate 275. Line 115 which carries SYNC signal 310 connects to the second input of AND gate 280. The outputs of AND gates 275 and 280, i.e., a sampled inverted DATA signal and a sampled SYNC signal, serve as inputs to NOR gate 285. The sampled inverted DATA signal and SYNC signal are combined in NOR gate 285 to produce a single bit stream. The output of NOR gate 285 connects to both J and K inputs of J-K flip-flop 290. Additionally, line 260 connects the 2XCLK signal to the clock (CK) input of flip-flop 290.

As is well-known in the art, a J-K flip-flop toggles at each rising edge of a signal applied to its CK input as long as high level signals are applied to both J and K inputs. Thus, in effect, the output of NOR gate 285 controls when flip-flop 290 toggles. As shown, flip-flop 290 toggles upon each rising edge of 2XCLK signal 320 as long as the go output of NOR gate 285 is high. Since a rising edge of 2XCLK signal 320 occurs at the beginning and a middle of a bit interval, the NOR gate output must blank, i.e., become low, during each zero data bit and during the protocol violation. As a result, the Q output of flip-flop 295 is a bi-phase mark signal, i.e., BIMDAT signal 325.

In operation, bi-phase mark modulator 251 transforms DATA signal 305 into a bi-phase mark signal wherein each zero in DATA signal 305 appears as a transition at the beginning of a bit interval and each one in DATA signal 305 appears as a transition at the beginning and at the middle of a bit interval. In addition, SYNC signal 310 is encoded into the bi-phase mark signal as a violation of the protocol mandating that a transition occur at the beginning of each bit interval. In essence, SYNC signal 310 is used to block or mask a transition within the framing sequence Illustratively, the protocol violation occurs between the last two bits of the framing sequence in BIMDAT signal 320. A driver circuit coupled to a transmission medium transmits BIMDAT signal 320 to a receiver and ultimately, to a decoder to recover the individual DATA, CLOCK and SYNC signals.

The encoder depicted in FIG. 2 is shown only as an illustration of one possible implementation using discrete components. Alternatively, for example, a circuit having a similar function can be implemented using programmable logic devices (PLD) such as the EP330-12 PLD manufactured by Altera Corporation of Irvine, Calif., or using an application specific integrated circuit (ASIC). Additionally, the position of the protocol violation discussed above is merely illustrative. The actual position of the violation will depend upon each individual application of the inventive technique. Also, the frame synchronization signal was illustratively described as occurring simultaneously with the position in the data where the protocol violation is to be placed in the framing sequence. However, those skilled in the art will realize that, broadly speaking, the protocol violation could be positioned anywhere within the entire frame.

Figures 4, 4A:
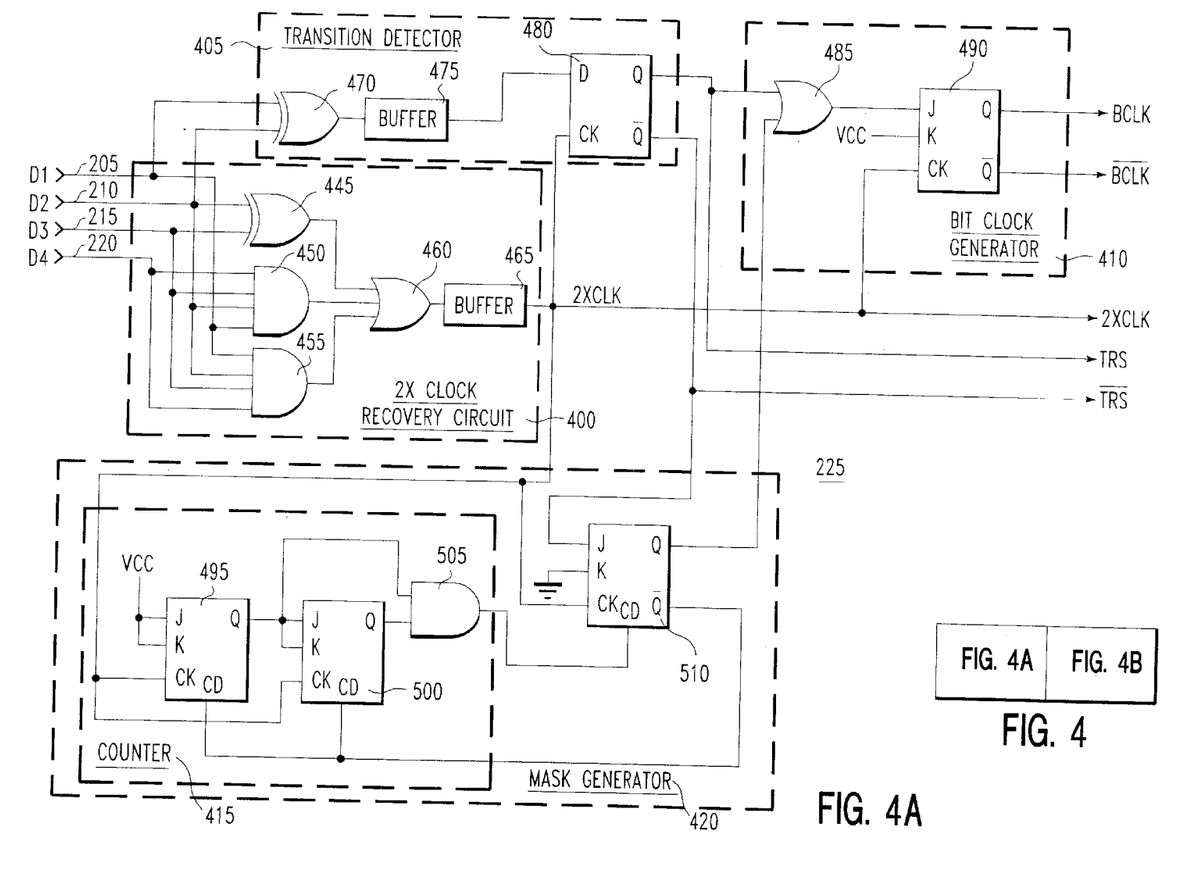
FIG. 4 shows the proper alignment of FIGS. 4A and 4B.
FIGS. 4A and 4B collectively show a schematic diagram of an inventive decoder 225.
Figure 4B:
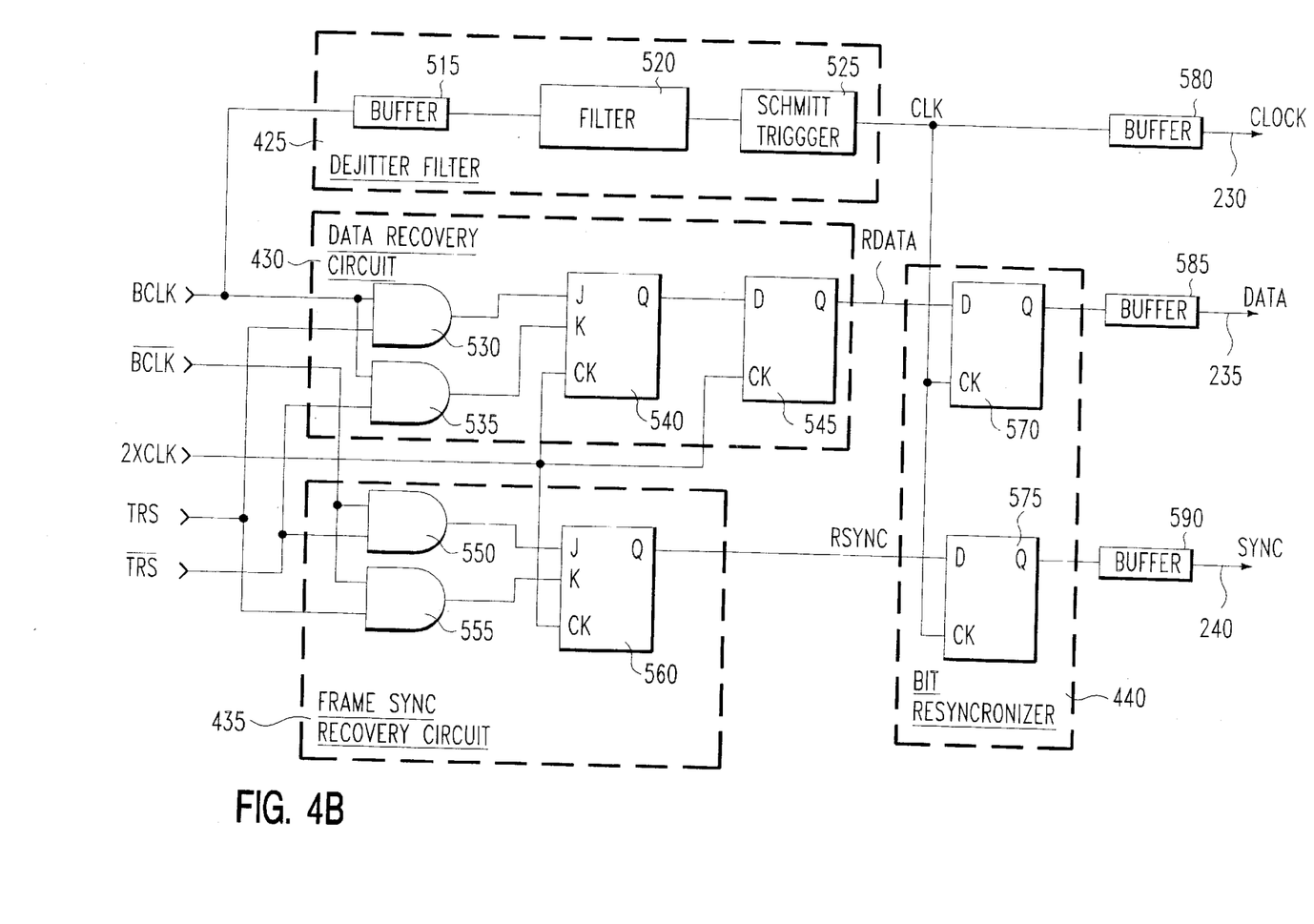

FIGS. 4A and 4B, in combination, collectively show a schematic diagram of decoder 225. Decoder 225 comprises 2X clock recovery circuit 400, transition detector 405, bit clock generator 410, mask generator 420, dejitter filter 425, data recovery circuit 430, frame sync recovery circuit 435, and bit resynchronizer 440.

In particular, from the tour delayed BIMDAT signals, inputs (D1, D2, D3 and D4) on lines 205, 210, 215, and 220, respectively, decoder 225 recovers the CLOCK, DATA and SYNC signals. Generally, using the delayed BIMDAT signals, 2X clock recovery circuit 400 generates a 2XCLK signal which is two times the bit interval frequency. Simultaneously, transition detector 405 generates a pulse that represents each transition in the BIMDAT signal. Subsequently, an output of transition detector 405, shown as the transition indicator signal (TRS), is used by bit clock generator 410 to generate a bit clock signal (BCLK). However, the missing transition at the protocol violation must be replaced to generate an accurate bit clock signal. Mask generator 420 produces a signal that enables the 2XCLK signal to insert a transition-into the BCLK signal at the protocol violation. Subsequently, the bit clock signal is filtered by dejitter filter 425 to produce, on line 230, the CLOCK signal.

Data recovery circuit 430 and frame sync recovery circuit 435 use BCLK, and its inversion, in combination with transition indicator signal TRS, and its inversion, to recover data and sync signals, RDATA and RSYNC, respectively. Subsequently, the recovered CLOCK signal is used by bit resynchronizer 440 to reclock the RDATA and RSYNC signals and produce, on lines 235 and 240, the DATA and SYNC signals, respectively. The DATA, SYNC and CLOCK signals are then passed along to a demultiplexer (not shown) to recreate the individual bit streams that comprise the information carried by the frames.

I will now discuss each individual circuit mentioned above in FIGS. 4A and 4B in detail. 2X clock recovery circuit 400 comprises exclusive OR (XOR) gate 445, AND gates 450 and 455, OR gate 460 and buffer 465. The AND gates, the XOR gate, and the OR gate logically combine the four delayed BIMDAT signals to produce a clock signal (2XCLK) having a cycle duration that is half the duration of a bit interval in the BIMDAT signal. Specifically, XOR gate 445 combines, using an exclusive OR function, the ½ bit delayed (D2) and the ¾ bit delayed (D3) BIMDAT signals, on lines 210 and 215, respectively, to produce a pulsatile signal having a ¼ bit long pulse corresponding to each transition in the BIMDAT signal. Simultaneously, AND gate 450 inverts and then combines, using an AND function, all of the delayed BIMDAT signals on lines 205, 210, 215, and 220. Simultaneously, AND gate 455 combines, using an AND function, all of the delayed BIMDAT signals. OR gate 460 combines, using an OR function, the output signals from XOR gate 445 and AND gate 450 and 455. Buffer 465 buffers a resultant output from OR gate 460. The OR gate output exits 2X clock recovery circuit 400 as output 2XCLK. The 2XCLK has a frequency which is twice the bit interval.

Transition detector 405 comprises XOR gate 470, buffer 475 and D flip-flop 480. Generally, XOR gate 470 produces pulses representing each transition in the BIMDAT signal; and flip-flop 480 lengthens the pulses representing each transition. Specifically, XOR gate 470 combines, using an exclusive OR function, the ¼ bit delayed (D1) and the ½ bit delayed (D2) BIMDAT signals, on lines 205 and 210, respectively, to produce a pulse having a ¼ bit duration for each transition in the BIMDAT signal. Buffer 475 buffers each such pulse as it exits XOR gate 470. D flip-flop 480 operates as a pulse stretcher to elongate each ¼ bit duration pulse to a ½ bit duration, i.e., equivalent to 1 cycle of the 2XCLK signal. The Q and $\overline{Q}$ outputs from flip-flop 480 are respectively labeled TRS and $\overline{TRS}$. Importantly, the TRS signal is high for the first half of each zero bit and high for the entire bit interval for each one bit except at the protocol violation.

Bit clock generator 410 comprises J-K flip-flop 490 produces the bit clock signal (BCLK) in response to the TRS signal and the 2XCLK signal. Flip-flop 490 produces BCLK by toggling its Q output at each rising edge of the 2XCLK signal. In this manner, the BCLK signal has a frequency that is one-half the 2XCLK signal frequency. In other words, the BCLK signal has a cycle duration equivalent to one-bit interval. However, the protocol violation will cause flip-flop 490 to produce an improper transition in the BCLK signal. Therefore, mask generator 420 produces a masking signal at the protocol violation. OR gate 485 inserts the masking signal into the TRS signal. The insertion of the masking signal causes flip-flop 490 to ignore the protocol violation while producing BCLK.

Mask generator 420 comprises counter 415 and J-K flip-flop 510. Counter 415, itself containing AND gate 505 and flip-flops 495 and 500, is a two-bit counter which is enabled by the $\overline{Q}$ output of flip-flop 510. Consequently, counter 415 is enabled by every "0" in the BIMDAT signal unless an immediately preceding "0" has previously enabled the counter. To ensure that the counter is enabled by a specific "0" in the BIMDAT signal, that "0" must be preceded by a "1", i.e., to ensure that the counter has fully counted and will start at zero upon the occurrence of the next "0". In this manner, when a bit pattern occurs in the BIMDAT signal having the binary form "10", this counter is enabled and flip-flop 510 generates, at its Q and $\overline{Q}$ outputs, a masking pulse having a two-bit duration. The masking pulse masks the occurrence of a protocol violation, if any, that follows the "10" bit sequence. During the occurrence of date bits with a binary "10" pattern that are not within the framing sequence, the flip-flop 510 generates a masking pulse, but the masking pulse has no effect upon the bit clock generator. However, when a "10" pattern appears in the framing sequence "0000101v1", the "10" pattern initiates the masking pulse which replaces the improper TRS signal at the input of flip-flop 490 within bit clock generator 410. As a result, flip-flop 490 toggles when it otherwise would not toggle, i.e., during the protocol violation, and the bit clock generator produces an accurate bit clock signal (BCLK). As those skilled in the art will readily recognize, the bit pattern that initiates the masking pulse could be any pattern. Also, circuitry could be implemented requiring recognition of a longer bit pattern than 2 bits prior to producing the masking pulse.

Dejitter filter 425 comprises buffer 515, filter 520 and schmitt trigger 525. Dejitter filter 425 reduces variation, which can result during the transmission and receiving processes, in the positions of the rising edges of the BCLK signal. Specifically, buffer 515 buffers the BCLK signal. The buffered BCLK signal is then sent to filter 520. Filter 520 has a low pass frequency response and a phase response such that the input signal, BCLK, and an output signal, CLK, maintain a phase relationship having a difference of less than 90°, with transitions of CLK always occurring later than corresponding transitions of BCLK. Subsequently, schmitt trigger 525 sharpens the edges of a filtered signal at the output of the filter and produces the CLK signal.

As previously noted, the TRS signal is high for the first half of each zero bit and is high for the entire bit interval for each one bit. From the TRS signal, data recovery circuit 430 converts the TRS signal into a data signal having a one represented by a high level and zero represented by a low level. Data recovery circuit 430 comprises AND gates 530 and 535, and flip-flops 540 and 545. The data recovery circuit decodes the TRS signal using the BCLK and 2XCLK signals. The output of the data recovery circuit (RDATA) represents the data which was encoded by the transmitter. Importantly, the BCLK signal is high during the second half of each bit interval. The BCLK signal samples the TRS signal, and its inversion, through AND gates 530 and 535. When the TRS signal indicates a logical one data bit, the TRS signal is high during the second half of each bit interval. When signals TRS and BCLK are both high, the output of AND gate 530 is high, as is the J input of flip-flop 540. Consequently, output Q of J-K flip-flop 540 is high during an entire bit interval. Conversely, when TRS is low ($\overline{TRS}$ is high), during the second half of the bit interval, the K input controls the output of flip-flop 540 and the Q output of this flip-flop is low for an entire bit duration. D flip-flop 545 reclocks the output of flip-flop 540 and generates, at its Q output, signal RDATA having a zero represented as a low signal for a full bit interval and one represented as a high signal for a full bit interval.

Similarly, frame sync recovery circuit 435 recovers the frame synchronization signal in response to the BCLK and TRS signals. As with data recovery circuit 430, the frame sync recovery circuit decodes the TRS signal using the BCLK and 2XCLK signals. The output of the frame sync recovery circuit represents the SYNC signal that was encoded by the transmitter. Importantly, the $\overline{BLCK}$ signal is high during the first half of each bit interval. Signal BCLK samples the TRS signal, and its inversion, using AND gates 550 and 555. To effectuate decoding the SYNC signal, the output of AND gate 550, and consequently the J input of flip-flop 560, both become high only when a protocol violation occurs, i.e., when $\overline{TRS}$, during the first half of a bit interval, is high. Usually, AND gate 555 maintains a high signal at the K input of flip-flop 560, thus maintaining a low output at the Q output of flip-flop 560. However, upon the occurrence of a protocol violation, the Q output of flip-flop 560 becomes high and produces RSYNC.

Both the RDATA and RSYNC signals are reclocked by bit resynchronizer 440 using the CLK signal. The bit resynchronizer comprises two D flip-flops 570 and 575. Specifically, flip-flop 570 reclocks RDATA with the CLK signal; similarly, flip-flop 575 reclocks RSYNC with the CLK signal. The outputs of decoder 225 are buffered by buffers 580, 585 and 590 to produce the CLOCK, DATA and SYNC signals, respectively.

As with the encoder, the decoder depicted in FIGS. 4A and 4B is shown only as an illustration of one possible implementation. For example, a circuit having a similar function can be produced using a programmable logic device (PLD) or an application specific integrated circuit (ASIC).

Additionally, the foregoing discussion only described a transmission in a single direction. Duplex transmission is easily implemented by installing a transmitter with a receiver at each end of the transmission medium. Those skilled in the art will recognize that some minor modification to the receiver and transmitter would be necessary to propagate full duplex signals on a single transmission medium.

Although I have shown and described, in detail, a single embodiment of my invention, those skilled in the art can readily devise many other varied embodiments that still incorporate my inventive teachings.

I claim:

1. In a data transmission system comprising means for transmitting a clock signal, a data signal, and a frame synchronization signal through a transmission medium, and means for receiving the clock, data, and frame synchronization signals from the transmission medium, an apparatus for synchronizing the clock, data, and frame synchronization signals comprising:

means for encoding the clock, data, and frame synchronization signals into a single bit stream formatted as a :bi-phase mark signal, the means for encoding comprising means for generating a plurality of timing signals; and means, responsive in part to the means for generating the plurality of timing signals, for encoding the frame synchronization signal as a protocol violation of the bi-phase mark signal; and means for decoding the bi-phase mark signal having the protocol violation therein and for recovering the clock, data, frame synchronization signals.

2. The apparatus of claim 1 wherein the bi-phase mark signal comprises a sequence of bit intervals and wherein the means for encoding comprises means for encoding a zero bit in the data signal as a transition at the beginning of a bit interval and a one bit in the data signal as transitions at the beginning and the middle of a bit interval.

3. The apparatus of claim 2 wherein each of the bit intervals has a duration equivalent to a cycle of the clock signal.

4. The apparatus of claim 3 wherein the protocol violation in the bi-phase mark signal occurs simultaneously with a transition at the beginning of a bit interval whereby the transition is removed.

5. The apparatus of claim 1 wherein the bi-phase mark signal comprises a sequence of bit intervals and the protocol violation occurs during a sequence of bit intervals fixed to a predetermined bit pattern.

6. The apparatus of claim 5 wherein the predetermined bit pattern corresponds to a bit pattern of 1011 in the data signal.

7. The apparatus of claim 5, wherein the predetermined bit pattern triggers the means for decoding to recover the frame synchronization signal from the protocol violation.

8. In a data transmission system comprising means for transmitting a clock signal, a data signal, and a frame synchronization signal through a transmission medium, and means for receiving the clock, data, and frame synchronization signals from the transmission medium, an apparatus for synchronizing the clock, data and frame synchronization signals comprising:

means for encoding the clock, data, and frame synchronization signals into a single bit stream formatted as a bi-phase mark signal, the means for encoding comprising means for generating, a plurality of timing signals; and means, responsive in part to the means for generating the plurality of timing signals, for encoding the frame synchronization signal as a protocol violation of the bi-phase mark signal; and means for decoding the bi-phase mark signal having the protocol violation therein and for recovering clock, data, and frame synchronization signals, means for decoding comprising means for masking the protocol violation in the bi-phase mark signal.

9. In a data transmission system comprising means for transmitting a clock signal, a data signal, and a frame synchronization signal through a transmission medium, and means for receiving the clock, data, and frame synchronization signals from the transmission medium, an apparatus for synchronizing the clock, data, and frame synchronization signals comprising:

means for encoding the clock, data, and frame synchronization signals into a single bit stream formatted as a bi-phase mark signal, the means for encoding comprising
means for generating a plurality of timing signals; and
means, responsive in part to the means for generating the plurality of timing signals, for encoding the frame synchronization signal as a protocol violation of the bi-phase mark signal;

means for decoding the bi-phase mark signal having the protocol violation therein and for recovering the clock, data, and frame synchronization signals;

means for transmitting the bi-phase mark signal having the protocol violation therein onto the transmission medium; and means for receiving the transmitted bi-phase mark signal having the protocol violation therein from the transmission medium.

10. The apparatus of claim 9 wherein the transmission medium is an optical fiber.

11. In a data transmission system wherein a clock signal, a data signal, and a frame synchronization signal are simultaneously transmitted over a transmission medium, a method of transmission comprising the steps of:

encoding the clock, data, and frame synchronization signals into a single bit stream formatted as a bi-phase mark signal, the step of encoding comprising the steps of
generating a plurality of timing signals; and
in response in part to the step of generating the plurality of timing signals, encoding the frame synchronization signal as a protocol violation of the bi-phase mark signal:

transmitting the bi-phase mark signal having the protocol violation therein through the transmission medium;

receiving the transmitted bi-phase mark signal having the protocol violation therein, from the transmission medium; and decoding the received bi-phase mark signal having the protocol violation therein, to recover the clock, data, and frame synchronization signals.

12. The method of claim 11 wherein the bi-phase mark signal comprises a sequence of bit intervals and wherein the step of encoding thee clock; data; and frame synchronization signals comprises the steps of:

encoding a zero bit in the data signal as a transition at the beginning of a bit interval; and encoding a one bit In the data signal as transitions at the beginning and the middle of a bit interval.

13. The method of claim 12 wherein each of the bit intervals has a duration equivalent to a cycle of the clock signal.

14. The method of claim 13 wherein the step of encoding the frame synchronization signal further comprises the step of:

encoding the protocol violation in the bi-phase mark signal simultaneously with a transition at the beginning of a bit interval whereby the transition is removed.

15. The method of claim 11 wherein the bi-phase mark signal comprises a sequence of bit intervals and the protocol violation occurs during a sequence of bit intervals fixed to a predetermined bit pattern.

16. The method of claim 15 wherein the predetermined bit pattern corresponds to a bit pattern of 1011 in the data signal.

17. The method of claim 15 wherein the step of decoding occurs in response to the predetermined bit pattern and comprises the step of recovering the frame synchronization signal from the protocol violation.

18. In a data transmission system wherein a clock signal, a data signal, and a frame synchronization signal are simultaneously transmitted over a transmission medium, a method of transmission comprising the steps of:

encoding the clock, data, and frame synchronization signals into a single bit stream formatted as a bi-phase mark signal, the step of encoding comprising the steps of
generating a plurality of timing signals; and
in response in part to the step of generating the plurality of timing signals, encoding the frame synchronization signal as a protocol violation of the bi-phase mark signal;

transmitting the bi-phase mark signal having the protocol violation therein through the transmission medium;

receiving the transmitted bi-phase mark signal having the protocol violation therein from the transmission medium; and decoding the transmitted bi-phase mark signal having the protocol violation therein to recover the clock, data, and frame synchronization signals, the step of decoding comprising the steps of:
generating a masking signal; and
masking the protocol violation in the masking signal.

19. An apparatus for encoding a clock signal, a data signal, and a frame synchronization signal, comprising:

means for generating a plurality of timing signals from the clock signal; and means, responsive in part to means for generating the plurality of timing signals, for incorporating the clock, data, and frame synchronization signals in a single bit stream formatted as a bi-phase mark signal, the means incorporating comprising means for encoding the frame synchronization signal as a protocol violation in the bi-phase mark signal.

20. The apparatus of claim 19 wherein the bi-phase mark signal comprises a sequence of bit intervals and wherein the means for incorporating comprises means for encoding a zero bit in the data signal as a transition at the beginning of a bit interval and a one bit in the data signal as transitions at the beginning and the middle of a bit interval.

21. The apparatus of claim 20 wherein each of the bit intervals has a duration equivalent to a cycle of the clock signal.

22. The apparatus of claim 21 wherein the protocol violation in the bi-phase mark signal occurs simultaneously with a transition at the beginning of a bit interval whereby the transition is removed.

23. The apparatus of claim 19 wherein the bi-phase mark signal comprises a sequence of bit intervals and the protocol violation occurs during a sequence of bit intervals fixed to a predetermined bit pattern.

24. The apparatus of claim 23 wherein the predetermined bit pattern corresponds to a bit pattern of 1011 in the data signal.

25. An apparatus for synchronizing the transmission of a data signal, that is organized into sequential frames each containing a sequence of data bits, in a data transmission system, comprising:

an encoder that, prior to transmission, encodes the data signal and a clock signal and a frame synchronization signal of the transmission system into a single bit stream formatted as a bi-phase mark signal, the encoder comprising a timing signal generator that produces a plurality of timing signals; and a modulator, responsive in part to the timing signal generator, that encodes the frame synchronization signal as a protocol violation of the bi-phase mark signal; and a decoder that, after transmission, decodes the bi-phase mark signal to recover the data, clock, and frame synchronization signals.

26. The apparatus of claim 25 wherein the bi-phase mark signal comprises a sequence of bit intervals and the protocol violation occurs during a sequence of bit intervals fixed to a predetermined bit pattern.

27. The apparatus of claim 26 wherein the predetermined bit pattern corresponds to a bit pattern of 1011 in the data signal.

28. The apparatus of claim 26 wherein the predetermined bit pattern triggers the decoder to recover the frame synchronization signal from the protocol violation.

* * * * *